Sept. 18, 1962　　T. BUDZICH ETAL　　3,054,263
HYDRAULIC TRANSMISSION
Filed July 5, 1960
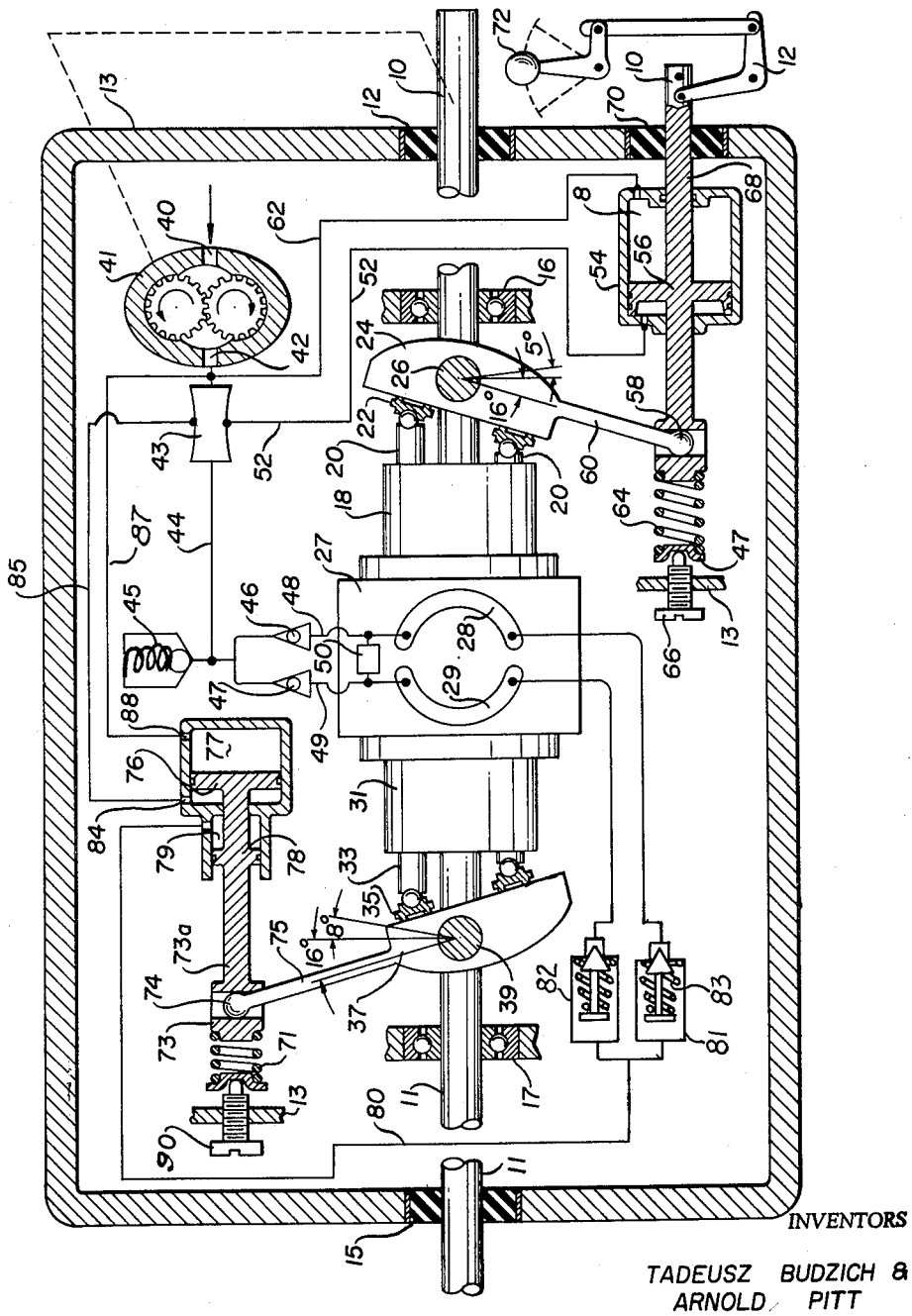
INVENTORS
TADEUSZ BUDZICH &
ARNOLD PITT
BY Richard H. MacCutcheon
ATTORNEY

United States Patent Office 3,054,263
Patented Sept. 18, 1962

3,054,263
HYDRAULIC TRANSMISSION
Tadeusz Budzich, 3344 Colwyn Road, Cleveland, Ohio, and Arnold Pitt, 5 Hillgarden Road, Weston, Ontario, Canada
Filed July 5, 1960, Ser. No. 40,602
8 Claims. (Cl. 60—53)

This application is a continuation-in-part of our co-pending patent application Serial No. 828,863, filed July 22, 1959, now abandoned, and relates to power transmissions particularly to those of hydraulic type comprising a fluid pump and fluid motor.

In more particular aspect the invention relates to hydraulic transmission and control system adapted for use in vehicles, such as for transmission of power in a vehicle from an internal combustion engine to driving elements such as wheels tracks, and the like.

In drive arrangements operated by internal combustion engine prime movers, it is customary to control the delivered power either by varying the amount of power generated in the engine or by varying the mechanical advantage between driving and driven elements or both. The hydraulic transmission with its infinitely variable drive ratio is especially adaptable to automatic and semi-automatic operation. There have been many many attempts to provide motor vehicles of various categories with variable ratio hydraulic transmissions operated by various control systems to meet the wide variety of operating conditions but heretofore the commercial units have been excessively expensive, large, heavy and not both infinitely variable and fully automatic unless the operation was accompanied by large losses.

With present hydraulic transmissions a movement of the usual control handle to increase the speed will produce a rapid acceleration of the vehicle, a movement of the control handle in opposite direction will produce a sudden braking action, the pump becoming a motor and driving the engine from fluid supplied by the hydraulic motor becoming a pump. This braking action becomes especially pronounced in the region of small pump displacements where the pump efficiency as a hydraulic motor is low. Because of these reasons the hydraulic transmission, despite its infinitely variable speed ratio will produce a rough and uncomfortable drive, instantly responding to the small sudden movements of the control.

Several attempts in the past were made to automatically vary the displacement of a hydraulic motor with respect to system pressure, which is proportional to the road resistance, and thus to obtain a measure of hydraulic overdrive. These attempts were unsuccessful because in a hydraulic transmission the pressure level at full power changes with displacement of the pump thus varying the power level at which the overdrive will start operating.

It is an object of the present invention to provide simple and inexpensive means for overcoming the above mentioned difficulties.

Another object of the invention is to provide a hydraulic transmission with an improved control system of automatic type.

Another object is to provide a transmission having the utmost simplicity of the external controls thus requiring for its operation minimum skill of the operator.

Another object is to provide a transmission which automatically reacts to engine r.p.m. and to road resistance to impose the best transmission ratio, this ratio changing with change in the driving conditions.

Another object is to provide a hydraulic transmission in which the only moveable connection to the engine, driving elements and frame are output and input shafts.

Another object is to provide a hydraulic transmission of an automatic type with infinitely variable speed ratio in which the displacement of the pump is controlled by pump r.p.m. (and therefore the engine r.p.m.) producing both smooth acceleration and braking action as required.

Another object is to provide a form of automatic hydraulic motor displacement decreasing change acting separately from the pump control and influenced by the road resistance and engine speed in which such change operates at specified engine power level irrespective of pump displacement and system pressure.

Another object is to provide a hydraulic transmission with which it is impossible to stall a driving internal combustion engine by road resistance or operation of the control.

Another object of this invention is to provide an improved automatic hydraulic transmission in which by a hand control the automatic control can be over-ridden to provide braking and reverse drive.

Further objects and advantages will become apparent from the following description, reference being had to the accompanying drawing in the single FIGURE of which a preferred form of the invention is clearly shown.

The present invention provides a hydrostatic transmission which is fully automatic and which has no controls whatsoever (except for reverse). The transmission is interposed between a usual internal combustion engine and driving wheels or tracks of a vehicle and will automatically change the mechanical advantage so as to give the best possible ratio for driving under all driving conditions.

According to the illustrated embodiment in the single figure of the drawing, an input shaft 10, which may be assumed to be rotatably driven by an internal combustion engine (not shown), is placed within a shaft seal 12 at one end of a transmission housing 13. As shown on the diagram all of the component parts are housed inside of this housing which may be an aluminum die casting. The housing contains both pump and motor, as hereafter explained, and is further modified to serve also as an oil reservoir thus eliminating a separate oil tank. The casting may be provided with fins (not shown) both on outside and inside surfaces so that the housing will also act as a heat exchanger eliminating the necessity of a separate oil cooler.

At the end opposite the input or pump shaft 10, an output or motor shaft 11 extends through a seal 15 in the housing 13, and may be assumed connected to drive wheels of the vehicle.

The shafts 10 and 11 are supported by bearings 16 and 17, respectively, while their inboard ends are supported by central bearings (not shown).

Both pump and motor are of the axial piston type in which a rotatable cylinder barrel carries pistons which are reciprocated by a swash plate and in the illustrated embodiment pump and motor are more or less identical, except opposite hand. The pump cylinder barrel 18 is mounted to rotate with pump shaft 10 (for example by means of a spline, not shown). Barrel 18 defines cylinders carrying pistons 20 each having a universally mounted piston shoe 22 which rests with conventional balancing lands against the flat face of a cam plate 24 which is pivoted on trunnions 26 located on either side of the central shaft 10 and for pivoting the cam 24 with respect to the housing 13. As the cylinder barrel 18 revolves, reciprocating motion is transmitted to the pistons 20 while, in more or less conventional manner, the cylinder barrel 18 works against the flat face of a valve plate 27 provided with kidney shaped discharge and suction passages shown only very diagrammatically at 28 and 29. For reducing the number of parts, pump and motor work back to back and the motor has a cylinder barrel 31 operative against a flat face of the same valve plate 27. Barrel 31 contains pistons 33 equipped with universally mounted piston shoes 35 which work against an inclinable cam plate 37 pivoted around trunnions 39. The motor cylinder barrel 31 drives the output shaft 11 as by splines (not shown). It is assumed that there are the same number of sets of piston assemblies in the motor cylinder block as in the pump cylinder block. As the cylinder block 18 revolves, driven by the shaft 10, the piston assemblies 20, 22 follow the inclined plane of the cam 24 and reciprocate. During a first 180° of rotation these piston assemblies are subjected to a suction stroke, during the next 180° of rotation these piston assemblies are subjected to the discharge stroke.

The larger the angular inclination of the cam 24 the longer the stroke of the pump and the larger the volume output of the pump. The kidney shaped recesses 28 and 29 extend right through the valve plate 27. It will be noted that the motor mechanism is identical to that of the pumping mechanism and works in substantially the same way and pressure fluid under what may be called system pressure extends from the cylinders of one to the cylinders of the other through the kidney shaped passages. To take care of loss, oil or other fluid is introduced as from the reservoir of the housing itself through an orifice 40 and a gear pump 41 driven by the input shaft 10. (The pump discharges through an orifice 42 into a venturi 43 and pump and venturi and associate lines as hereafter described constitute a speed governor. For minimal expense of manufacture and to minimize maintenance difficulties, various fluid passages as hereafter described and illustrated in a one line diagram may be assumed to be drillings through the walls of housing 13. As shown, a line 44 extends from venturi 43 to a low pressure safety valve 45, and through two non-return check valves 46 and 47, respectively, then through passages 48, 49 to the timing kidney passages 28, 29. If desired, the lines 48 and 49 may be joined by a safety valve 50.

Thus, the pump 41 will supply a small quantity of oil to the suction kidney (29 or 28 depending on rotation of the engine and on forward or reverse actuation of the vehicle). If kidney 29 is subjected to the high pressure of pump and motor operation valve 47 will seat and will not permit the flow of oil to the gear pump, and the kidney 28 becomes the suction kidney through which the oil under the discharge pressure of the gear pump will pressurize the inlet of the transmission and keep the piston assemblies in contact with the cam plates 24 and 37 during the suction stroke, while any excess of oil over the leakage of pumping and motoring units will be discharged through the safety valve 45 into the transmission housing.

It should be noted that the revolutions of the gear pump 41 correspond with the revolutions of the shaft 10 and therefore with the revolutions of the engine, and thus a quantity of oil proportional to engine r.p.m. flows through the venturi 43 and a pressure drop in the venturi will always be proportional to engine r.p.m. The throat of venturi 43 is connected as through a drilling 52 with a hydraulic actuator cylinder 54 containing a control piston 56 operating the cam 24 about the trunnions 26 through a ball joint 58 and arm 60. If it be assumed that the cam 24 may be moved through an angle, e.g. from 16° to vertical and then in its overcenter position from 0 to 5° as indicated on the drawing, to control the displacement of the pump, then, since the input of the pump shaft revolves at the speed of the power source, the main pump will discharge a volume of oil which depends on cam angle and on engine speed. The piston 56 divides the actuator 54 into low and high pressure zones, with the low pressure zone connected through the lead 52 with the low pressure zone of the venturi nozzle 43 and the high pressure zone connected through a lead 62 directly to the gear pump output at 42. The gear pump 41 and the venturi nozzle 43 are also responsive to shaft r.p.m., and thus main pump r.p.m., and constitute a hydraulic governor which will always supply a volume of oil proportional to pump r.p.m. The pressure drop in the throat of the venturi 43 is proportional to pump r.p.m. and the lower pressure therein acts on the left side of the actuator piston 56 while the other side of the piston is subjected to the discharge pressure of the gear pump 41, and the combined pressure differential, that is the difference of pressure acting on both ends, is then transmitted to the actuator stem and spherical joint 58, arm 60, to cam 24 revolving it around pin 26 against the opposing force of a spring 64 which, as shown, bears against the left end of the actuator piston 56 stem with a force opposing the force due to pressure differential acting on piston 56. If desired the action of spring 64 may be made adjustable by adjusting the spring far end with respect to the housing 13 by means of an adjusting screw 66. The control of the pump is so arranged that with the engine stationary the spring 64 will bring the trunnion mounted cam plate 24 into vertical or zero stroke, zero displace-position. As shown a right end stem 68 extends out of the actuator 54 and out of the housing through a seal 70 where it is connected to a manually operable control including a handle 72.

During operation, the higher the engine r.p.m. the higher the volume output of the gear pump 41, the higher the pressure drop in the venturi nozzle 43, therefore the higher the force of the pressure differential acting on the piston 56 opposing the spring 64 to increase the angle of the cam 24 and increase the volume output of the main pump, while the manual control works in such a way that when the need for reverse action, or even for braking of the vehicle, arises, movement of the handle 72 can override the automatic control already described and forcibly move the cam plate 24 into a smaller (or reverse) angular position. Since the vehicle will be moving and since momentarily the speed of the vehicle will be unchanged, the motor 31 may immediately become a pump, the pump 18 will become a motor and the vehicle will be subjected to a braking torque. With further movement of the stem 68 operated by handle 72, after the vertical zero position is reached the pump may be brought into its overcenter position therefore putting the vehicle into reverse and any further movement of the handle 72 will cause higher and higher reverse speeds because of higher angular inclination of the trunnion mounted cam in its overcenter position. But in normal operation the control of the pump is such that it automatically changes the angle of inclination of the cam with increase or decrease of drive shaft r.p.m. The higher the shaft r.p.m. the higher the angle of inclination of the cam. Since volume output of the pump 18 is proportional both to engine r.p.m. and to angle of inclination of cam 24, the higher the r.p.m. the higher the volume output of the pump except that the control automatically changes the volume output of the pump in respect to pump r.p.m.

Basically the pump can operate without the automatic motor displacement decreasing change mechanism about to be described. Were the mechnism not to be used, the position of the motor cam 37 would be fixed and the arrangement would work satisfactorily. However, the mechanism to be described will improve the efficiency of the unit and permit, whenever the road resistance is small, driving the vehicle at high speed with very low engine r.p.m. so that the losses due to high velocity and rubbing in the engine cylinders are all reduced. In essence the mechanism is shown having an adjustment screw 90 for a spring 71 for a socket 73 and ball joint 74 controlling arm 75 associated with the stem 73a of a stepped piston having a large base portion 76 working in a chamber 77 and a small base portion 78 working in a smaller cylinder 79. The volume of the space 79 is connected to the system pressure at the transmission kidney shaped passages 28 and 29 by a passage 80 and a pair of one way check valves 81 and 82 which may be retarded by inertia or gravity or by springs 83. When springs 83 are used they normally hold their respective valves 81, 82 off their valve seats. The small piston 78 subjected to the system pressure in the space 79 moves in unison with the large piston 76 operable in the large chamber 77 from which a port 84 is connected through conduit 85 with the low pressure point of the venturi 43 to permit low fluid pressure to be introduced. A relatively high pressure connection extends directly from the gear pump discharge 42 through a conduit 87 to a port 88 at the opposite side of the piston 76. The stem 73a works in direct contact with the spherical end 74 of the motor cam plate 37 and at the same time it is opposed by the spring 71 adjustable by screw 90.

Pressure differential between ports 84 and 88 aids system pressure in the enclosure 79 so that when pump r.p.m. is small (so that the pressure differential generated in the nozzle 43 is small), a much higher system pressure operating in the space 79 is required to overcome the preload of the spring 71 in order to swing the motor cam plate 37 towards its maximum angular position. On the other hand, with high pump r.p.m. (high venturi nozzle pressure differential) the very substantial force acting on piston 76 tending to urge it to the left aids the action of the system pressure acting on piston 78 and a much lower system pressure is needed in order to swing 37 towards its maximum position, and this motor cam 37 may assume its maximum angular position at a much lower system pressure.

Operation of the pump (or speed governor) control has already been considered. The actual operation of the motor control is somewhat analagous. From the description of pump operation heretofore recited it should be clear that with the cam plate 24 of the pump at a small angular displacement (without manual over-ride) there is undoubtedly a small pump r.p.m. because displacement of the pump is proportional to pump r.p.m. Accompanying this small displacement is a potential in the pump of high discharge pressure. On the other hand, with the very low pump rotational speed, the speed governor influence is very small and therefore the forces acting on the motor control piston 76 opposing the spring 71 and abetting the force developed in the space 79 and acting on the small piston 78 will all be small, and a higher system pressure acting in the space 79 will be required to compress the spring 71. However, with increase of pump speed, and therefore increase of speed of the governor, the pressure differential of gear pump output with respect to pressure drop in the venturi nozzle becomes progressively higher and therefore the force acting on the large piston 76 and tending to move it toward the left will progressively more and more influence the displacement of the motor cam plate 37. Therefore, since at higher pump speeds the forces developed due to gear pump and venturi pressure acting on the piston 76 are greater, said forces help to compress the spring 71 and the movement of the motor cam plate 37 will take place at lower system pressures and in this way a predetermined pressure level, acting and changing with pump speed and influencing the operation of the motor displacement change, will be obtained. As already mentioned this will improve the efficiency of the unit because whenever road resistance is low the vehicle can be driven at high speed with low engine r.p.m. As a second advantage with a lower engine r.p.m. the prime mover engine can be worked in a condition of fully or near fully open throttle where the compression ratio of the engine makes it the most efficient.

As above described the motor control is basically independent of the pump control, and while the pump control will automatically change the volume output of the pump with respect to pump r.p.m., the motor control operates primarily according to system pressure which is always proportional to road resistance. The higher the road resistance the higher the system pressure. Therefore the system pressure provides a measure of the road resistance and with the control as described with a low system pressure (low road resistance) the hydraulic transmission is automatically put into overdrive.

All this will be understood by those in the art but it may be further explained by saying that torque output of an internal combustion engine is appreciably constant despite change of speed. Therefore, with the pump cam 24 in a near zero position it is theoretically possible to develop in the hydraulic circuit infinitely large pressures when absorbing the full engine torque with a very small volume of fluid. With increases of the volume output of the pump the maximum discharge pressure at full engine torque is continuously being reduced. Since more oil is then pumped with the same torque input, the pressure must go down. This is an inherent characteristic of all hydrostatic transmissions. But according to one aspect of the present invention the motor control is made responsive not to pressure alone. According to the invention, the motor control will respond to high pressures with a very small volume output of the pump and will respond to much lower pressures with large volume output of the pump. For the ideal solution the motor displacement decreasing mechanism should start to cut in and cut out at pressure levels which are related to the position of the trunnion cam. This means that with the pump working near its maximum output the pressure level at which the motor control would cut in should be low. At very small pump outputs the pressure level at which the motor control will cut in should be high. That is why the present invention is hereafter defined in terms of pressure levels, and that is why the stepped piston is shown as one way to give an input to the motor control proportional to the engine speed which is proportional to pump speed and thus to volume output of the pump, so that the motor control input or feed back is proportional to the volume output of the pump.

As already mentioned there is a certain predetermined pressure at which the motor control mechanism will automatically start functioning. With low road resistance it is put into operation to lower the engine or transmission input r.p.m. It is of course possible to select a predetermined arbitrary level at which the motor control will cut in. For a certain angular position of the pump cam plate, it may be assumed that the maximum system pressure that the pump is capable of generating utilizing full power of the engine is 4000 p.s.i. Then it can arbitrarily be arranged that from 4000 p.s.i. to 2000 p.s.i., that is to half of the maximum discharge pressure, the motor control will be inactive. At this time the transmission output is performed with maximum displacement of the motor and thus with maximum torque development capability of the hydraulic motor. But if the pressure should drop below 2,000 signifying a reduction in road resistance then it is to advantage to shift to activate the motor control and lower the engine r.p.m. and from this moment the control will start gradually shifting the drive into the reduced motor displacement position. Suppose that for a smaller angular position of the pump cam 24 the maximum system pressure for 100% utilization of the horsepower would be 5000 p.s.i. then we would like to start operating the motor control at 2500. Next, suppose that with the maximum angular displacement of the pump cam 24 the pump will be only capable of generating 2000 p.s.i. Then the motor displacement change mechanism is to start operating at 1000 p.s.i. Since the maximum pressure generated in the pump is proportional to the displacement of the pump and since the displacement of the pump is made proportional to the pump r.p.m. by the governor, the apparatus is automatically controlled by feed-back arrangement adjusting this pressure level so it will switch at half the maximum discharge pressure said maximum discharge pressure being the pressure developed when utilizing 100% of engine torque.

With conventional hydraulic transmissions a sudden increase of load, or sudden demand on the engine by the controls may stall the internal combustion engine. In the present invention any sudden overload while reducing the engine speed and therefore pump r.p.m. will automatically reduce the pump displacement raising the operating pressure level and increasing the effective transmission ratio. With the engine r.p.m. brought down by the load to near idling speed the pump control comes into its near zero displacement position unloading the engine and providing the maximum transmission ratio.

There is thus provided apparatus of the class described capable of meeting the objects above set forth. Without compromising performance, the system simplifies connections and parts, and many combinations, such as the motor control and the overriding reverse lever, are integrated into the transmission in such a way that the particular feature can be eliminated, if desired, without major redesign of the transmission.

While we have illustrated and described a particular embodiment, various modifications may obviously be made without departing from the true spirit and scope of the invention which we intend to have defined only by the appended claims taken with all reasonable equivalents.

We claim:

1. In a vehicle having an engine, a transmission comprising, a rotatable first pump of the variable displacement type drivingly connected to the engine, a member for changing the displacement of said first pump, said member including piston means, a second pump responsive to the engine speed and adapted to provide fluid flow proportional to the engine speed, fluid conducting means connecting said second pump and said piston means, fluid flow constricting means operably associated with said second pump and said piston means adapted to transmit a pressure signal to said piston means proportional to the engine speed, a fluid motor, and fluid pressure conducting means connecting said first pump and said motor.

2. The device of claim 1 further characterized by spring biasing means normally urging said pump displacement changing member toward a minimum displacement position.

3. The device of claim 2 further characterized by means to selectively adjust the force of said spring biasing means.

4. In a vehicle having an engine, an automatically variable speed ratio transmission, comprising, a rotatably driven pump drivingly connected to the engine and a fluid motor of variable displacement type having a member for changing displacement thereof, a device for sensing the rotational speed of the pump, pressure fluid conducting means connecting said pump and said motor, and control means responsive to said speed sensing device and also responsive to the pressure in said conducting means, said control means being operably connected to said motor displacement changing member to adjust the displacement changing member between predetermined system pressure levels as set by the pump speed.

5. The device of claim 4 further characterized by said control means including first piston means responsive to the pressure in said conducting means, and second piston means responsive to the pump speed.

6. The device of claim 5 further characterized by spring biasing means operably connected to said member for changing the displacement of the motor, said spring normally urging said member to its position of minimum displacement.

7. The device of claim 6 further characterized by said first and second piston means positioned to oppose said spring biasing means, whereby the displacement of the motor is controlled both by change of speed of the pump and change of pressure in the fluid conducting means.

8. In a vehicle having an engine, a transmission comprising, a rotatable pump of the variable displacement type drivingly connected to the engine, said pump having a first member for changing the displacement thereof, means for sensing the rotational speed of the pump, first control means connected to said first member and responsive to the means for sensing the rotational speed of the engine adapted to adjust the displacement of the pump proportional to the engine speed, a fluid motor of the variable displacement type, fluid pressure conducting means connecting said pump and said motor, a second member adapted to change the displacement of said motor, second control means connected to said second member and responsive to the means for sensing the speed of the engine and also responsive to the fluid in fluid conducting means between the pump and the motor to adjust the displacement of the motor between predetermined system pressure levels.

References Cited in the file of this patent

UNITED STATES PATENTS

| | | |
|---|---|---|
| 2,257,724 | Bennetch | Oct. 7, 1941 |
| 2,326,821 | Boyle | Aug. 17, 1943 |
| 2,420,155 | Tucker | May 6, 1947 |
| 2,472,477 | Harrington et al. | June 7, 1949 |
| 2,600,632 | French | June 17, 1952 |
| 2,804,827 | Rydberg | Sept. 3, 1957 |
| 2,921,439 | Krafft et al. | Jan. 19, 1960 |

FOREIGN PATENTS

| | | |
|---|---|---|
| 605,386 | Germany | Nov. 9, 1934 |